UNITED STATES PATENT OFFICE.

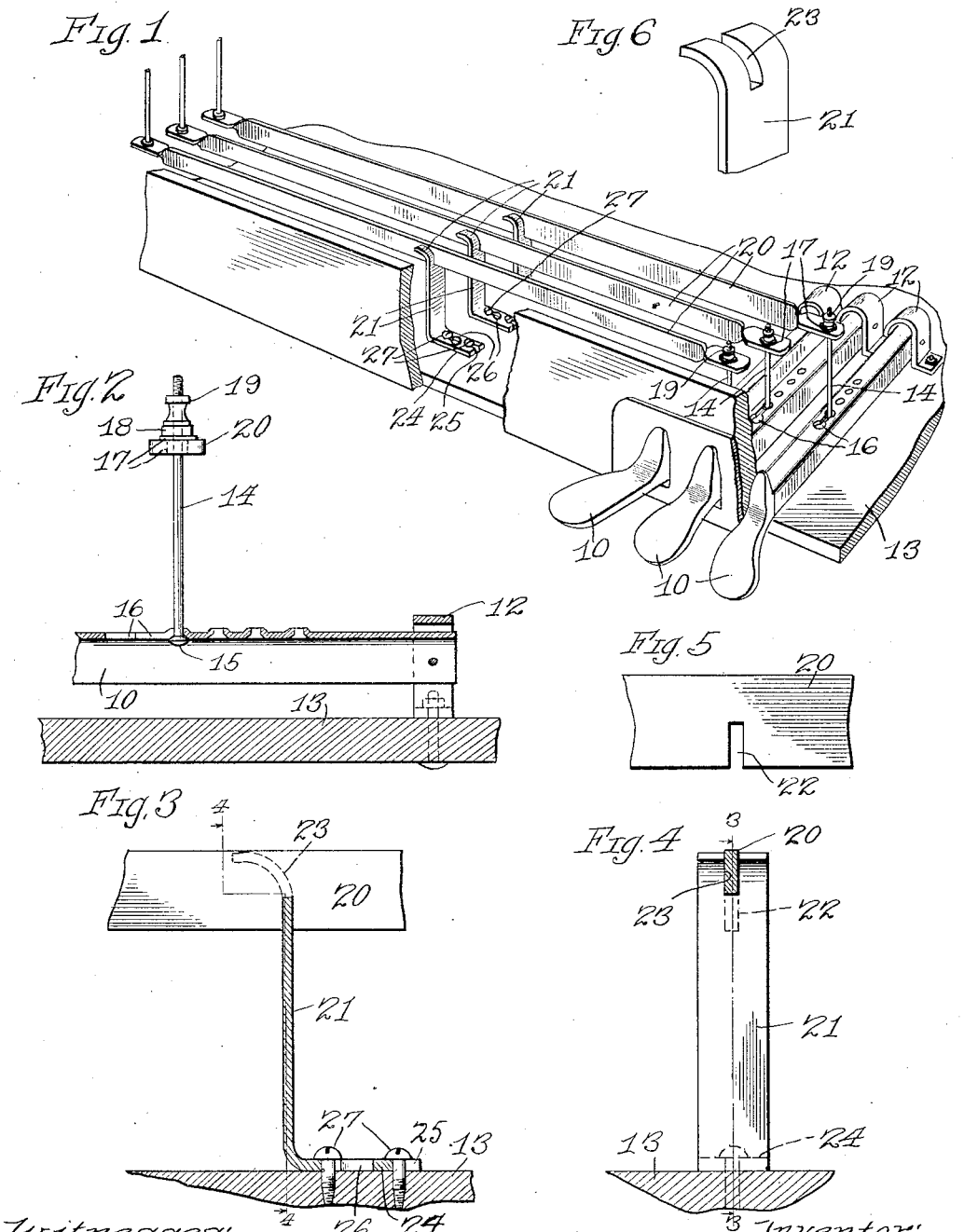

FREDERICK ENGELSKIRCHEN, OF CHICAGO, ILLINOIS, ASSIGNOR TO GEORGE P. BENT COMPANY, OF CHICAGO, ILLINOIS, A CORPORATION OF ILLINOIS.

PEDAL TRAP-WORK.

1,089,119.      Specification of Letters Patent.      Patented Mar. 3, 1914.

Application filed August 20, 1913. Serial No. 785,613.

*To all whom it may concern:*

Be it known that I, FREDERICK ENGELSKIRCHEN, a citizen of the United States, residing at Chicago, in the county of Cook and State of Illinois, have invented certain new and useful Improvements in Pedal Trap-Work, of which the following is a specification, reference being had therein to the accompanying drawing.

My invention relates to pedal trap work for pianos and consists in the matters hereinafter disclosed and then pointed out in the appended claims.

In the accompanying drawings illustrating the various features of my invention Figure 1 is a top perspective view of trap work constructed according to my invention; Fig. 2 is a detail view showing the connection between the pedal and prop; Figs. 3 and 4 are sectional views on the lines 3—3 and 4—4 respectively, and Figs. 5 and 6 are detail views.

In the drawings the reference numeral 10 indicates a pedal of the usual metallic construction pivoted upon a mounting 12 suitably secured to the pedal board 13 of the piano. The prop 14 which connects the pedal to the lever is provided with a head 15 adapted to enter the enlarged portion of a slot 16 in the pedal so that after the head is passed through the enlarged portion of the slot the prop may be moved to position in the reduced portion of the slot to have its head engage the under surface of the material of the pedal adjacent the slot. The upper end of the prop is screw threaded and is provided with a bushing 17 and a nut 18 by which it is adjustably connected to the pedal lever, a lock nut 19 being employed to lock the parts in adjusted position. The pedal lever 20 is of any usual form, preferably a flat metal strip having its ends twisted or given a quarter turn, and is detachably connected to its spring 21 so that it may be taken off and placed in position by merely raising it from its seat while the spring affords bearing faces which hold the lever in its alined position. For this purpose the lever is provided in its lower edge with a vertical slot 22 of a width equal to the thickness of the material of the spring, and the upper end of the spring is bent laterally preferably in a direction away from the pedals and the bent portion is provided with a slot 23 equal in width to the thickness of the material of the pedal lever.

When the parts are assembled the lever is passed into the slot 23 and the slot 22 in the lever passes down over the adjacent straight or upright portion of the spring whereby the lever and spring are detachably connected together while the slot in the lever interlocks with the spring so that it may be put under tension when the pedal is depressed and the opposite faces of the slot in the laterally bent end of the spring afford extended side bearings for the lever to retain it in position at right angles to the spring and in its alined relation with respect to the pedal. Each spring is provided with a laterally bent lower end 24 which is provided with a marginal slot 25 and an inner slot 26 having an enlarged end, the bodies of the slots being adapted to underlie the heads of the fastening screws 27 so that the spring may be removed and replaced by merely loosening the screws and slipping the spring into and out of position under the screw heads.

By the construction disclosed the pedals may be removed without taking off the nuts or lock nuts on the pedal props as the heads of the props may be passed through the enlarged portion of the slots of the pedals, so that the levers may be removed without detaching the props or changing the adjustment, while the springs may be taken off the pedal board without entirely removing the screws 27, and the parts may be readily assembled on the pedal board by connecting the prop to the lever before connecting the prop to the pedal and after the lever is seated on its spring the head of the prop is readily passed to position in the slot of the pedal.

I claim:—

1. In a device of the class described, a pedal, a pedal lever having a marginal slot in its lower edge, detachable connections between the lever and pedal, and a spring having its upper edge curved and provided with a slot in its curved portion to receive the pedal lever, the slot in the lever fitting on the body of the spring below its slot.

2. In a device of the class described, a pedal having a slot provided with an enlarged end, a pedal lever having a marginal slot in its lower edge, a prop adjustably connected at one end to the lever and at its other end having a head to pass through the enlarged end of the pedal slot, a spring having its ends oppositely bent and provided with a marginal slot in its upper end and with screw-receiving slots in its lower end, and screws having heads overlying the edges of the slots in the lower end of the spring, the slot in the lever fitting on the body of the spring below its upper slot and the walls of the upper slot of the spring forming extended side bearings for the lever.

In testimony whereof I affix my signature in presence of two witnesses.

FREDERICK ENGELSKIRCHEN.

Witnesses:
L. E. TITUS,
J. McROBERTS.

Copies of this patent may be obtained for five cents each, by addressing the "Commissioner of Patents, Washington, D. C."